(12) United States Patent
Sikora et al.

(10) Patent No.: US 9,363,534 B2
(45) Date of Patent: Jun. 7, 2016

(54) METHOD AND DEVICE FOR PROCESSING A VIDEO SEQUENCE

(75) Inventors: Thomas Sikora, Berlin (DE); Andreas Krutz, Berlin (DE); Alexander Glantz, Berlin (DE)

(73) Assignee: VESTEL ELEKTRONIK SANAYI VE TICARET A.S. (TR)

( * ) Notice: Subject to any disclaimer, the term of this patent is extended or adjusted under 35 U.S.C. 154(b) by 346 days.

(21) Appl. No.: 13/504,739

(22) PCT Filed: Oct. 28, 2010

(86) PCT No.: PCT/EP2010/006854
§ 371 (c)(1),
(2), (4) Date: Jul. 10, 2012

(87) PCT Pub. No.: WO2011/050997
PCT Pub. Date: May 5, 2011

(65) Prior Publication Data
US 2012/0269272 A1    Oct. 25, 2012

Related U.S. Application Data

(60) Provisional application No. 61/279,983, filed on Oct. 29, 2009.

(51) Int. Cl.
*H04N 19/117* (2014.01)
*H04N 19/182* (2014.01)
*H04N 19/82* (2014.01)
*H04N 19/86* (2014.01)
*H04N 19/597* (2014.01)
(Continued)

(52) U.S. Cl.
CPC ............. *H04N 19/86* (2014.11); *H04N 19/117* (2014.11); *H04N 19/159* (2014.11); *H04N 19/172* (2014.11); *H04N 19/182* (2014.11); *H04N 19/46* (2014.11); *H04N 19/597* (2014.11); *H04N 19/61* (2014.11); *H04N 19/82* (2014.11)

(58) Field of Classification Search
None
See application file for complete search history.

(56) References Cited

U.S. PATENT DOCUMENTS 6,278,735 B1 * 8/2001 Mohsenian .................. 375/240
7,512,182 B2 * 3/2009 Chen ....................... 375/240.29
(Continued)

FOREIGN PATENT DOCUMENTS

EP           1641274 A1    3/2006
WO        2011050997 A1    5/2011

OTHER PUBLICATIONS

Werf et al., "I.McMIC: A Single-Chip MPEG-2 Video Encoder for Storage," IEEE Journal of Solid-State Circuits, vol. 32, No. 1, Nov. 1997, pp. 1817-1823.*
(Continued)

*Primary Examiner* — Jay Patel
*Assistant Examiner* — Reza Aghevli
(74) *Attorney, Agent, or Firm* — Brooks Kushman P.C.

(57) ABSTRACT

An embodiment of the invention relates to a method for processing the pixel amplitude of at least one block image pixel contained in a video sequence, said method comprising the steps of: —constructing an individual motion trajectory comprising motion-shifted versions of said block image pixel over a multiplicity of neighboring frames; and—combining the pixel amplitudes of the motion-shifted versions of said block image pixel along the individual motion trajectory using a weighting function, to form a processed pixel amplitude of said image pixel.

11 Claims, 4 Drawing Sheets

(51) Int. Cl.
*H04N 19/159* (2014.01)
*H04N 19/172* (2014.01)
*H04N 19/46* (2014.01)
*H04N 19/61* (2014.01)

(56) References Cited

U.S. PATENT DOCUMENTS

| | | | |
|---|---|---|---|
| 7,852,936 B2* | 12/2010 | Mukerjee et al. | 375/240.15 |
| 8,009,732 B2* | 8/2011 | Bhaskaran | 375/240.12 |
| 2003/0053545 A1 | 3/2003 | Lainema et al. | |
| 2004/0027454 A1* | 2/2004 | Vella et al. | 348/155 |
| 2006/0045181 A1 | 3/2006 | Chen | |
| 2008/0056366 A1 | 3/2008 | Bhaskaran | |
| 2008/0089419 A1* | 4/2008 | Kervec et al. | 375/240.17 |
| 2008/0247462 A1* | 10/2008 | Demos | 375/240.03 |
| 2009/0109341 A1* | 4/2009 | Oguz et al. | 348/625 |
| 2009/0154816 A1 | 6/2009 | Swazey et al. | |
| 2010/0002770 A1* | 1/2010 | Motta et al. | 375/240.16 |
| 2010/0296579 A1* | 11/2010 | Panchal et al. | 375/240.15 |
| 2010/0321583 A1* | 12/2010 | Shields et al. | 348/699 |
| 2011/0064375 A1* | 3/2011 | Raghoebardajal et al. | 386/224 |

OTHER PUBLICATIONS

Werf et al., "I.McIC: A Single-Chip MPEG-2 Video Encoder for Storage," IEEE Jour. Solid-State Circuits, vol. 32, No. 11, Nov. 1997, pp. 1817-1823.*

Clarke R J, XP002625531, Section 9.9.3.: Motion-compensated filtering. Digital Compression of Still Images and Video; [Signal processing and its applications], Jan. 1, 1995 Academic Press, London—ISBN 978-0-12-175720-5; ISBN 0-12-17520-X. p. 274.

Albert Van Der Werf et al., XP011060614, I.McIC: A Single-Chip MPEG-2 Video Encoder for Storage. IEEE Journal of Solid-State Circuits, vol. 32, No. 11, Nov. 1, 1997, IEEE Service Center, Piscataway, NY, USA—ISSN 0018-9200. pp. 1817-1823.

Karsten Mueller et al., XP030041614, Multiview Coding using AVC. 75. MPEG meeting; Jan. 16, 2006; Bangkok; (Motion PictureExpert Group or ISO/IEC JTC1/SC29/WG11), Jan. 11, 2006—ISSN 0000-0240. 13 Pages.

PCT International Search Report Dated Apr. 18, 2011, Applicant Thomas Sikora, Application No. PCT/EP2010/006854, 4 Pages.

PCT International Preliminary Report on Patentability and Written Opinion of the International Searching Authority Dated May 1, 2012, Applicant Thomas Sikora, Application No. PCT/EP2010/006854, 9 Pages.

PCT International Search Report Dated Nov. 2, 2012, Application No. PCT/EP2012/063110, 4 Pages.

Mehmet K. Özkan et al., "Adaptive Motion-Compensated Filtering of Noisy Image Sequences", IEEE Transactions on Circuits and Systems for Video Technology, vol. 3, No. 4, Aug. 1993, pp. 277-290.

Aljoscha Smolić et al., "Long-Term Global Motion Estimation and Its Application for Sprite Coding, Content Description, and Segmentation", IEEE Transactions on Circuits and Systems for Video Technology, vol. 9, No. 8, Dec. 1999, pp. 1227-1242.

Alexander Glantz et al., "Video Coding Using Global Motion Temporal Filtering", ICIP 2009 IEEE, pp. 1053-1056.

Peter List et al., "Adaptive Deblocking Fitler", IEEE Transactions on Circuits and Systems for Video Technology, vol. 13, No. 7, Jul. 2003, pp. 614-619.

Eric Dubois et al., "Noise Reduction in Image Sequences Using Motion-Compensated Temporal Filtering", IEEE Transactions on Communications, vol. Com-32, No. 7, Jul. 1984, pp. 826-831.

Jens-Rainer Ohm, "Three-Dimensional Subband Coding with Motion Compensation", IEEE Transactions on Image Processing, vol. 3, No. 5, Sep. 1994, pp. 559-571.

Xianglin Wang et al., "Simplified Update Step of Motion Compensated Temporal Filtering for Video Coding", Nokia Research Center, Picture Coding Symposium, Apr. 24 26, 2006, Beijing, 5 Pages.

Dũng T. Võ et al., "Optimal Motion Compensated Spatio-Temporal Filter for Quality Enhancement of H.264/AVC Compensated Video Sequences", ICIP 2009 IEEE, pp. 3173-3176.

* cited by examiner

METHOD AND DEVICE FOR PROCESSING A VIDEO SEQUENCE

CROSS-REFERENCE TO RELATED APPLICATIONS

This application is a U.S. national phase of PCT application No. PCT/EP2010/006854 filed Oct. 28, 2010, which, in turn, claims the benefit of U.S. provisional application No. 61/279,983 filed Oct. 29,2009, the disclosures of which are incorporated in their entirety by reference herein.

The present invention relates to a method and device for processing a video sequence.

BACKGROUND OF THE INVENTION

In modern communication systems video compression/coding is of prime importance. Due to limited bandwidth allocation of-ten so-called lossy algorithms are employed (i.e. in ISO MPEG standards /1/). These algorithms use quantization of pixels or transform coefficients to adjust bit rate to channel capacity. This results in more or less visible coding artifacts in many applications.

OBJECTIVE OF THE PRESENT INVENTION

An objective of the present invention is to provide a method for efficient processing of a noisy digital video sequence in order to reduce noise for predictive video coding and/or post-filtering applications.

A further objective of the present invention is to provide a device system capable of efficient processing of a noisy digital video sequence in order to reduce noise for predictive video coding and/or post-filtering applications.

BRIEF SUMMARY OF THE INVENTION

An embodiment of the invention relates to a method for processing the pixel amplitude of at least one block image pixel contained in a video sequence, said method comprising the steps of:
  constructing an individual motion trajectory comprising motion-shifted versions of said block image pixel over a multiplicity of neighboring frames; and
  combining the pixel amplitudes of the motion-shifted versions of said block image pixel along the individual motion trajectory using a weighting function, to form a processed pixel amplitude of said image pixel.
Preferably the method further comprises the steps of:
  including said block processed pixel amplitude in the video sequence; and
  generating a video data bit stream that describes said video sequence.

Further, a stop marker may be added to the video data bit stream that describes the individual length of said individual motion trajectory.

According to a further preferred embodiment, the method further comprises the steps of:
  constructing at least two individual motion trajectories, said at least two individual motion trajectories differing in their length and referring to motion-shifted versions of at least two different image pixels contained in the same block;
  combining the pixel amplitudes of the motion-shifted versions of each of said at least two different image pixels along their individual motion trajectories using a weighting function, to form at least two processed pixel amplitudes of said at least two different image pixels;
  including said at least two processed pixel amplitudes in the video sequence; and
  generating a video data bit stream that describes said video sequence.

Further, an individual stop marker may be added for at least one of the processed pixel amplitudes to the video data bit stream, said individual stop marker describing the individual length of the individual motion trajectory that was used for forming said at least one processed pixel amplitude.

Furthermore, individual stop markers may be added for each processed pixel amplitude to the video data bit stream, wherein the individual stop markers describe the individual length of the individual motion trajectories that were used for forming the processed pixel amplitudes.

Furthermore, the individual motion trajectory of said image pixel may be constructed by concatenating at least two block motion vectors between adjacent frames of the video sequence, said at least two block motion vectors describing the motion of image blocks, each of which comprises said image pixel.

Said at least two block motion vectors between adjacent frames of the video sequence may be coded in the video bit stream.

Moreover, the frames of said video sequence may be filtered and/or predicted by incorporating said processed pixel amplitude of said image pixel into the video sequence.

Preferably, at least one flag bit is generated to signal the presence of the processed pixel amplitudes in the video sequence.

During processing the pixel amplitude of an image pixel in a current frame, the individual motion trajectory of this image pixel may be constructed based on motion-shifted versions of said image pixel in prior and consecutive frames.

Further video sequences having spatially adjacent frames with the same image pixel may be taken into account to form said processed pixel amplitude of said image pixel.

During processing the processed pixel amplitude of said block image pixel is preferably formed by recursive accumulation of the pixel amplitudes of the motion-shifted versions of said image pixel along the individual motion trajectory.

Preferably the method comprises at least two different process modes, wherein, in each process mode, an individual maximum number of frames is considered for constructing the individual motion trajectory of the at least one image pixel, and wherein a flag is generated which indicates the process mode that has been carried out.

A further embodiment of the invention relates to a device for processing pixel amplitudes of at least one block image pixel contained in a video sequence, said device comprising:
  trajectory constructing means configured to construct an individual motion trajectory comprising motion-shifted versions of said block image pixel over a multiplicity of neighboring frames; and
  combining means configured to combine the pixel amplitudes of the motion-shifted versions of said block image pixel along the individual motion trajectory using a weighting function, to form a processed pixel amplitude of said image pixel.

Said trajectory constructing means may be capable of constructing at least two individual motion trajectories, said at least two individual motion trajectories differing in their length and referring to motion-shifted versions of at least two different image pixels.

Said combining means may be capable of combining the pixel amplitudes of the motion-shifted versions of each of said at least two image pixels along their individual motion trajectories using a weighting function, to form at least two processed pixel amplitudes of said at least two image pixels.

The device may further include:
- a video sequence building means capable of including said at least two processed pixel amplitudes in the video sequence; and
- a marker adder capable of adding at least one stop marker for one of the processed pixels, said individual stop marker describing the individual length of the individual motion trajectory of said pixel.

The device may also further include a flag bit generator adapted to generate at least one flag bit to signal the presence of the processed pixel amplitudes in the video sequence.

The device may be an encoder for encoding an incoming video data bit stream to generate an encoded video data bit stream. The encoder may comprise a data bit generator capable of generating a video data bit stream that describes said video sequence. Further, the encoder may be configured to include said processed pixel amplitudes generated by said combining means into the encoded video data bit stream.

Alternatively, the device may be a decoder for decoding an encoded video data bit stream to generate a decoded video sequence. The decoder may include means for decoding data bits that describe said video sequence. The decoder may be further configured to include said processed pixel amplitudes generated by said combining means into the decoded video sequence.

The described invention enables the efficient processing of a noisy digital video sequence with the prime purpose to reduce noise for predictive video coding and/or post-filtering applications. The described approach evaluates long-term motion parameters to calculate image pixels or transform coefficients with reduced noise variance.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which

It is well known from theory that noise variance can be reduced by a factor of N if N versions of a sample are averaged and if the noise added to the individual samples is not correlated /2/. Digital video signals consist of a sequence of consecutive images captured by a video camera. Since usually neither the video camera nor the captured content are fast moving, consecutive images in video are highly correlated—they contain similar objects (i.e. foreground and background objects). Often these objects are visible in multiple if not even in a vast number of consecutive frames. In modern video compression systems therefore pixels in a current frame are predicted based on pixels in a previous frame. This is referred to as short-term prediction. In FIG. 1 this basic approach is outlined.

The pixel P10 in the original frame O to be coded is predicted from the previously coded frame C1. In case that the pixel P10 is part of an image object that moved between frames, the intensity value of P10 can be estimated from the motion-shifted version P11 in the previous frame. A motion vector mv10 (black arrow) describes the horizontal motion shift (dx) and the vertical motion shift (dy). For each motion-shifted pixel in O, a motion vector is described (i.e. estimated). The intensity I11 of the discovered motion shifted pixel P11 in C1 is used as an estimate of the intensity 110 of P10 in O. The grey motion vector mv10 is used in this document to identify the correspondence of related motion-shifted pixels between frames for illustrative purposes only. FIG. 2 uses this notation.

Figure 1:
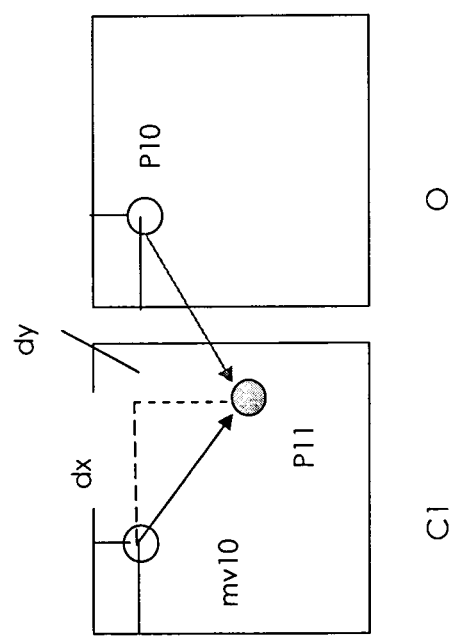
FIG. 1 shows in an exemplary fashion a prediction of motion between frames C1 and O using translational motion vector mv(dx,dy), wherein pixel P10 in frame O is found in an already quantized and coded frame C1 at shifted location dx,dy, wherein the white pixel is the one to be predicted in frame O, and wherein pixel P11 is the one identified in the previously coded frame C1.
Figure 2:
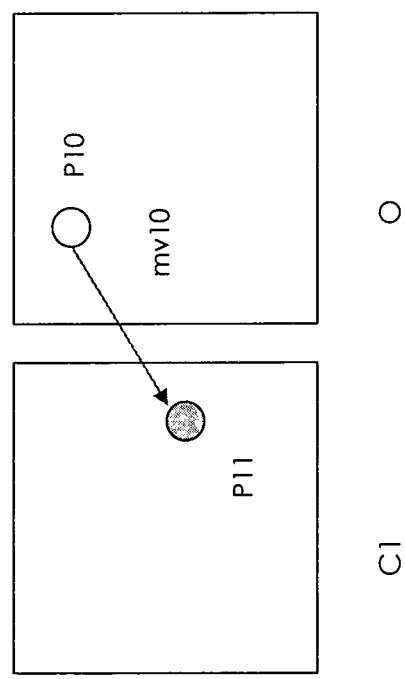
FIG. 2 shows in an exemplary fashion a simplified illustration of prediction of motion between frames, wherein motion vector mv10 is used to show correspondence of pixels between frames.

As outlined above, in modern video coding systems frame C1 in FIG. 2 is an already quantized and coded frame also known to the receiver. Frame O is the frame to be coded. Usually a predictive error coding approach is used to transmit information about P10 to the receiver. If the motion vectors are transmitted in a bitstream, both encoder and decoder calculate a motion-compensated prediction P10=P11. The prediction error P10-P10 is again quantized/coded and transmitted to the receiver. Both encoder and receiver reconstruct the quantized version of P10 for display—and for storage in a local memory to predict pixels in the next frame. In coding standards such as MPEG-4 neighboring prediction error pixels are coded as quantized coefficients of a linear transformation—details of such approaches are omitted here for simplicity purposes.

In these state-of-the art prediction error coding approaches, particular problems arise at low bit rates, where coded frames (such as C2 in FIG. 3) contain many coding artifacts. Coding artifacts can be seen as noise added to the pixel values after reconstruction of a frame. The more noise is contained in the pixels used for prediction (i.e. frame C1) the less accurate the prediction is and the higher the resulting remaining prediction error that needs to be coded (i.e. in frame O).

The current state-of-the-art coding standard H.264/AVC employs a de-blocking filter in the coding prediction loop to reduce coding noise for prediction error coding /1/. The algorithm performs de-blocking of single images in an Intra-frame approach without taking motion of objects within a sequence of video images into account. In contrast, the invention described in this document uses motion vectors estimated between frames in a sequence to achieve this goal. Noise filtering is employed along a motion trajectory. This results in significantly reduced noise in areas with coherent motion, because multiple version of the same or similar pixel content can be used to arrive at a noise reduced pixel value. Noise variance can be reduced by a factor of N if N versions of a sample are averaged and if the noise added to the individual samples is not correlated.

In publication /3/ the authors propose to employ noise filtering for video sequences using an infinite impulse response (IIR) filter in temporal direction. This method uses an approach similar to the invention described in this paper, whereby the temporal direction is used for filtering using motion information. However, filtering pixels using an IIR filter between two frames only provides very small means for controlling the length of the motion trajectory, which is of vital importance.

The invention described here in an exemplary fashion addresses noise reduction for predictive error coding at low bit rates and efficient post-filtering of noisy video frames.

For predictive coding applications the described approach evaluates long-term motion parameters along a motion trajectory involving multiple previously coded frames. This enables to calculate image pixels for prediction (or transform coefficients) with reduced noise variance.

Figure 3:
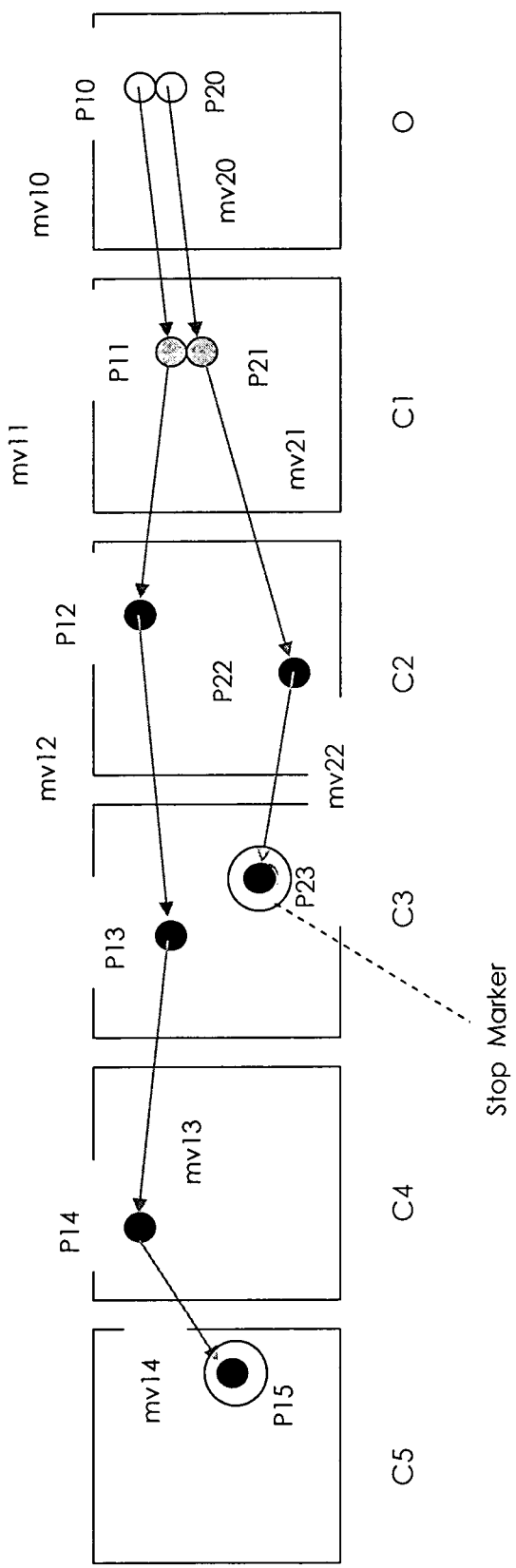
FIG. 3 shows in an exemplary fashion a prediction of pixels P10 and P20 in frame O using motion-shifted versions of these pixels in a multiplicity of previous frames, wherein for each pixel an individual motion trajectory is estimated and a stop marked signals the individual length of the trajectory.

In this approach, motion-shifted versions of the pixels in frame O are identified in a flexible number of previously coded frames. In FIG. 3 it is shown that motion vectors can be estimated between adjacent previous frames, each mapping a correspondence between pixels in any two frames. For pixels P10 in frame O an individual motion trajectory is calculated, whereby each motion vector in a trajectory points to a noisy representation of P10 in previous frames. It can be seen in FIG. 3 that for a neighboring pixel P20 a motion trajectory is also identified. In a typical embodiment of the invention neighboring pixels in an image block (e.g. 4×4 or 8×8 block in MPEG-4) may have individual (non-parallel) motion trajectories.

In the example illustrated in FIG. 3 pixels P11-P15 are five noisy versions of P10—the length of the trajectory for P10 equals N=5. Intensities of P21-P23 are noisy versions of P20 and the length N of the trajectory equals 3. The motion vectors may also have non-integer values so that sub-pixel interpolation, as with standards video coding algorithms (e.g. MPEG-4), needs to be employed.

FIG. 3 illustrates the approach of the invention using a chain of motion vectors. In an alternative embodiment it is possible to estimate motion vectors directly between frames O-C1, O-C2, O-C3, etc. This improves estimation accuracy of pixels.

A prediction of a pixel (i.e. P10 or P20) in frame O is performed using all or a subset of the N noisy versions along the motion trajectory, P10=f(P11, . . . , P1N). Here, f is a function of P11-P1N. An example of such a mapping is a simple averaging of all pixel intensities of P11-P1N. More advanced functions take lightning changes or prediction accuracy of motion vectors into account and allow flexible weighting functions. Other weighting influencing factors are also possible.

In this approach the length N can be allocated adaptively for each single pixel or each block of pixels (e.g. 4×4, 8×8 or 16×16 blocks as in ISO MPEG-4) in frame O in an adaptive way. Length N can also be the same for all relevant pixels in a frame but different for different frames in a video sequence. In some applications it is of benefit to allocate fixed N for all pixels in a frame and even for many frames in a sequence.

In a first preferred embodiment of the invention, individual pixels (or segments of pixels, i.e. blocks) in frame O can have different trajectory length N and one or more stop markers that are transmitted in the video compression bitstream. FIG. 3 illustrates such stop markers. It is also possible to transmit one stop marker per frame or sequence to make the approach sequence or frame adaptive. The stop marker may be identical with the length N of the trajectory.

In a second preferred embodiment of the invention, the prediction of the pixels in frame O is not restricted to past frames in a sequence. Since the general approach taken is to identify as many noisy versions of a pixel in other frames of a video sequence, it is also possible to use coded future frames of a sequence. For example many video coding standards (such as ISO MPEG-4) use so-called B-frame prediction. B-frames are predicted from past and/or future coded P-frames. Using this philosophy the coded frames C1-C5 in FIG. 3 could be already coded P-frames relating to future frames. Taking future as well as past frames into account is also possible, in which case C1-C5 contain future as well as past frames. In this case motion trajectories pointing into the future as well as into the past are necessary for each pixel in frame O and these trajectories may have different length N. The different length N may need to be transmitted to the receiver.

In a third preferred embodiment, corresponding pixels are also found in locally adjacent frames in a multi-view transmission scenario, whereby a scene is captured using multiple cameras. For each camera scene a video stream is coded and transmitted. Inter-view predictive coding usually helps reducing overall required bit rate. In such applications the invention allows to predict pixels in a frame O from a number of pixels in past and/or future frames as well as in spatially adjacent frames with different views of the scene. Similar to motion trajectories, between frames of adjacent views, disparity vectors are estimated that identify the location of corresponding pixels in previously coded views. A disparity trajectory of a certain length N is identified and transmitted to the receiver. The combination of prediction from past and future frames as well as from adjacent views is possible whereby different length N may need to be coded in the bitstream.

In a fourth preferred embodiment, the invention uses coded motion vectors as usually coded in a video bitstream to predict corresponding pixels from past, future and/or spatially adjacent frames using the described invention. In addition it is possible to use so-called Intra coded block signals in coded video sequences (e.g. using ISO MPEG-4) as coded stop markers so that no additional motion vectors and/or stop markers need to be transmitted. Intra coded block signals usually signal segments of pixels in a sequence that cannot be predicted from past or future frames and may serve as natural stop markers. It is also possible to use other block type information as coded stop marker in /1/(i.e. Inter-macroblocks without transmitted motion vectors or skipped macroblocks) to identify regions in a frame that are not coded using long-term prediction.

In a fifth preferred embodiment the encoder and decoder adaptively switches between long-term and short-term prediction. This approach is suitable in frames where a long-term prediction is not providing substantial benefit over existing methods. To this end, for each frame a decision is taken at the encoder towards which mode provides best performance in a rate-distortion framework, prediction from C1 only or from a trajectory of length N (N>1). This can be achieved for example by evaluating prediction accuracy of both methods at the encoder. It is also possible to fuse both prediction results into one prediction (i.e. average of short- and long-term prediction). A flag is transmitted in the bitstream to signal to the decoder the suitable prediction mode (long-term or short-term or fused prediction). A flag can be transmitted, i.e. for each sequence of frames, each frame or even for each block in a frame. The flag may also allow adaptive prediction between past and future frames or spatial views.

In a sixth preferred embodiment, frame O is also an already coded frame and the pixels (i.e. P10 or P20) contain coding noise. To arrive at a filtered low noise version of pixels in O, a filtering along the motion trajectory is possible. This involves N+1 pixels, including the corresponding one in frame O. This is a post-filtering approach that can be used for noise reduction after decoding a video sequence. For example, a filtered version of P10 in FIG. 3 is estimated using function f(P10-P15), which involves six samples. Adaptive length with stop marker transmission including past, future and spatially adjacent frames, as well as adaptive switching between short-term and long-term filtering, can be combined to allow high inter-sequence or inter-frame adaptability.

Figure 4:
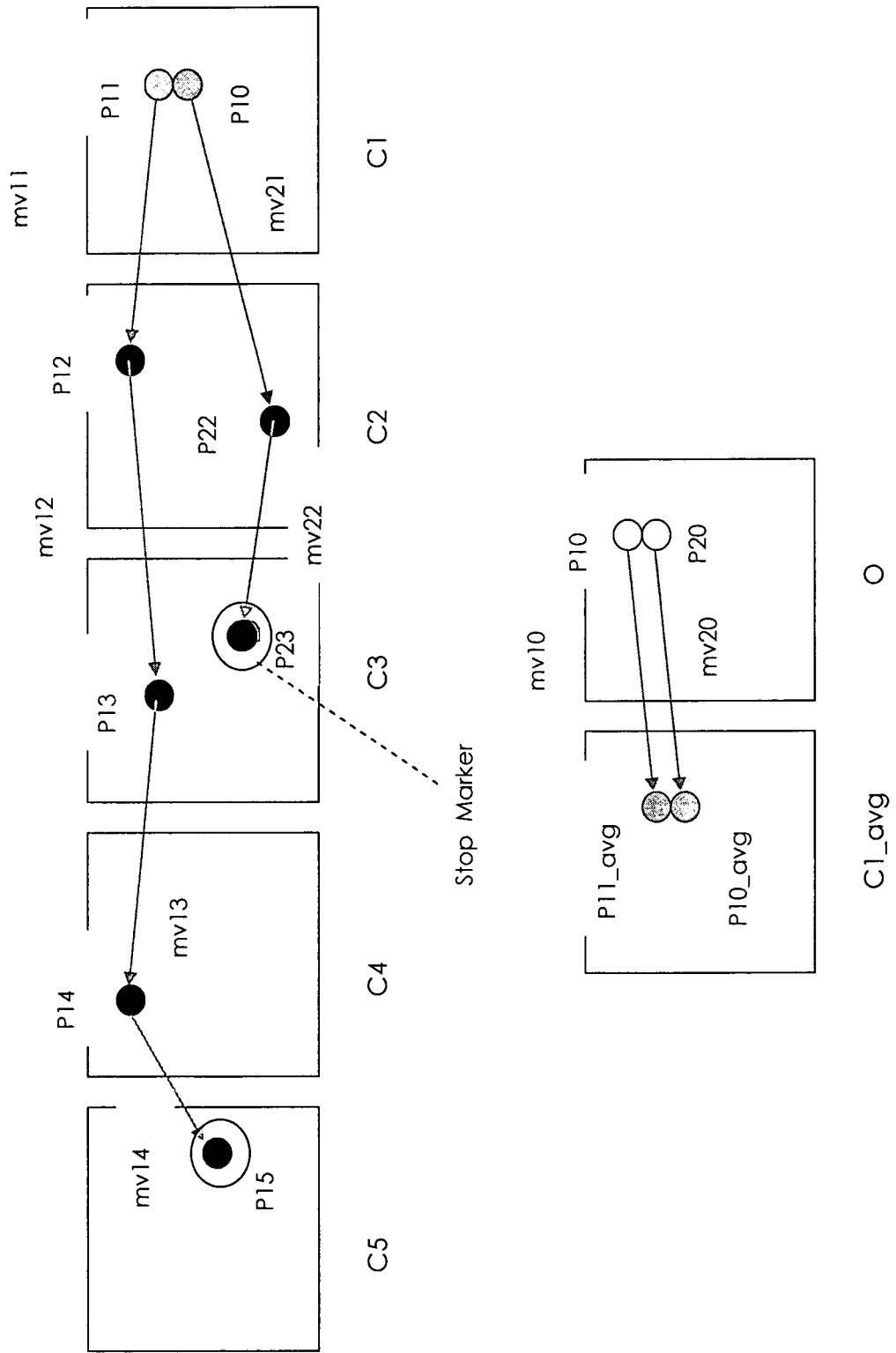
FIG. 4 shows in an exemplary fashion that pixels in frames C1-C5 are recursively accumulated into frame C1_avg and used for prediction of pixels in frame O.

In a seventh preferred embodiment, post-filtering and prediction is performed based on one recursively updated prediction frame stored in a frame memory. This significantly reduces implementation complexity. In FIG. 4 the basic approach is illustrated. Here C1_avg is the accumulated image used that contains smoothed pixels along the motion trajectories (i.e. P11_avg=f(P11-P15)). For some pixels this accumulated image may also contain stop marker information. As in FIG. 4 this accumulated image C1_avg is used for prediction or post-filtering. In a next recursive step the accumulated image C1_avg is updated with P10_avg=P11_avg+P11. For future frames this recursion using one frame memory is continued.

In all of the preferred embodiments, processing of the motion vectors and/or stop markers as well as the filtering itself may be performed in a block-based manner, as it is common custom in video compression standards such as MPEG-4 /1/. In addition, it is possible to combine the long-term motion-compensated prediction or filtering in the transform coefficient domain, by calculating weighted averages of coefficient values along a motion trajectory rather than pixel intensity values.

In standard coding algorithms such as MPEG-4 usually one motion vector is transmitted for a block of pixels, i.e. for blocks of size 4×4, 8×8, 16×16. In these state-of-the-art techniques, all pixels in a block are displaced using the same motion vector to find correspondences in previous or future frames. It is a specific characteristic of the invention, that motion vectors used for adjacent pixels in a block of frame O in FIG. 3 are in parallel (see mv10 and mv20) while motion vectors of the corresponding pixels in frame C1 (mv11, mv21) are not necessarily in parallel (non-identical motion shift), depending on the content of the scene.

In a final note it is clarified, that for post-filtering applications as well as for predictive coding, transmission of motion vectors and stop markers is not necessary, depending on the application and quality requirements. Estimation of motion vectors and stop markers is also possible at the decoder to a certain extend. To improve reconstruction quality it is possible to transmit motion vectors to the receiver and estimate or stop markers at the decoder or vice versa.

REFERENCES

/1/ISO/IEC 14496-10, MPEG-4/Part 10. MPEG-4 AVC Standard.
/2/Peter Noll, "Lecture Notes: Statistische Nachrichtentheorie" (in English: "Statistical Communication Theory"), Technische Universität Berlin, Fachgebiet Nachrichtenubertragung, 2003.
/3/Ling Shao, et al., "Motion-Compensated Techniques for Enhancement of Low-Quality Compressed Videos", Proceedings of the IEEE International Conference on Acoustics, Speech, and Signal Processing (ICASSP), 2009.

The invention claimed is:

1. A method for processing pixel amplitude of a block image pixel contained in a video sequence, the method comprising the steps of:
constructing an individual motion trajectory comprising motion-shifted versions of the block image pixel over a multiplicity of neighboring frames; and
combining pixel amplitudes of the motion-shifted versions of the block image pixel along the individual motion trajectory using a weighting function, to form a processed pixel amplitude of the image pixel;
generating a video data bit stream that describes the video sequence;
adding a stop marker to the video data bit stream that describes individual length of the individual motion trajectory, wherein a marker adder is used that is capable of adding a plurality of stop markers, wherein one stop marker is added for one of the processed pixels, the individual stop marker describing the individual length of the individual motion trajectory of the pixel;
constructing at least two individual motion trajectories, the at least two individual motion trajectories differing in length and referring to motion-shifted versions of at least two different image pixels contained in the same block;
combining pixel amplitudes of the motion-shifted versions of each of the at least two different image pixels along their individual motion trajectories using a weighting function, to form at least two processed pixel amplitudes of the at least two different image pixels; and
including the at least two processed pixel amplitudes in the video sequence.

2. The method of claim 1 further comprising including the processed pixel amplitude in the video sequence.

3. The method according to claim 1 further comprising the step of adding an individual stop marker for at least one of the processed pixel amplitudes to the video data bit stream, the individual stop marker describing individual length of the individual motion trajectory that was used for forming the at least one processed pixel amplitude.

4. The method according to claim 1 wherein the individual motion trajectory of the image pixel is constructed by concatenating at least two block motion vectors between adjacent frames of the video sequence, the at least two block motion vectors describing motion of image blocks, each of which comprises the image pixel.

5. The method according to claim 4, wherein the at least two block motion vectors between adjacent frames of the video sequence are coded in a video bit stream.

6. The method according to claim 1 wherein frames of the video sequence are filtered and/or predicted by incorporating the processed pixel amplitude of the image pixel into the video sequence.

7. The method of claim 6 wherein at least one flag bit is generated to signal the presence of the processed pixel amplitude in the video sequence.

8. The method according to claim 1 wherein during processing the pixel amplitude of an image pixel in a current frame, the individual motion trajectory of this image pixel is constructed based on motion-shifted versions of the image pixel in prior and consecutive frames.

9. The method according to claim 1 wherein further video sequences having spatially adjacent frames with the same image pixel are taken into account to form the processed pixel amplitude of the image pixel.

10. The method according to claim 1 wherein the processed pixel amplitude of the block image pixel is formed by recursive accumulation of the pixel amplitudes of the motion-shifted versions of the image pixel along the individual motion trajectory.

11. The method according to claim 1 further characterized by at least two different process modes;
   wherein, in each process mode, an individual maximum number of frames is considered for constructing the individual motion trajectory of the image pixel; and
   wherein a flag is generated which indicates the process mode that has been carried out.

* * * * *